United States Patent
Salkintzis et al.

(10) Patent No.: US 9,729,529 B2
(45) Date of Patent: Aug. 8, 2017

(54) DEVICE AND METHOD FOR PROVIDING BOOTSTRAPPED APPLICATION AUTHENTICATION

(75) Inventors: Apostolis K Salkintzis, Athens (GR); Michael F Coulas, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 999 days.

(21) Appl. No.: 12/366,395

(22) Filed: Feb. 5, 2009

(65) Prior Publication Data
US 2010/0167695 A1 Jul. 1, 2010

Related U.S. Application Data

(60) Provisional application No. 61/142,173, filed on Dec. 31, 2008.

(51) Int. Cl.
*H04M 3/16* (2006.01)
*H04L 29/06* (2006.01)
(Continued)

(52) U.S. Cl.
CPC ............ *H04L 63/062* (2013.01); *H04L 63/08* (2013.01); *H04L 65/1006* (2013.01);
(Continued)

(58) Field of Classification Search
CPC ............... H04L 63/062; H04L 65/1016; H04L 65/1006; H04L 63/08; H04W 12/06; H04W 12/04; H04W 80/10
See application file for complete search history.

(56) References Cited

U.S. PATENT DOCUMENTS 8,572,708 B2 * 10/2013 Barriga ............... H04L 63/0815
380/229
2006/0095767 A1   5/2006 Krishnamurthi et al.
(Continued)

FOREIGN PATENT DOCUMENTS

EP         1956858 A1   8/2008
WO     2004075584 A1   9/2004
(Continued)

OTHER PUBLICATIONS

Patent Cooperation Treaty, "PCT Search Report and Written Opinion of the International Searching Authority" for International Application No. PCT/US2009/067280 Mar. 5, 2010, 15 pages.
(Continued)

*Primary Examiner* — Amancio Gonzalez
(74) *Attorney, Agent, or Firm* — Lerner, David, Littenberg, Krumholz & Mentlik, LLP

(57) ABSTRACT

The present invention provides a device and a method in a device for authenticating the device for use in a network. The method includes requesting a first security context for use in securing a first type of communication, where as part of requesting the first security context, a second security context is jointly requested for use in securing a second type of communication. The first security context is then received and used to provide secure access and communication via the first type of communication. The second security context is then received and used to provide secure access and communication via the second type of communication.

18 Claims, 5 Drawing Sheets

(51) Int. Cl.
  *H04W 12/06* (2009.01)
  *H04W 12/04* (2009.01)
  *H04W 80/10* (2009.01)

(52) U.S. Cl.
  CPC ......... *H04L 65/1016* (2013.01); *H04W 12/06* (2013.01); *H04W 12/04* (2013.01); *H04W 80/10* (2013.01)

(56) References Cited

U.S. PATENT DOCUMENTS

| | | |
|---|---|---|
| 2006/0280305 A1 | 12/2006 | Bajko et al. |
| 2007/0074275 A1 | 3/2007 | Bajko et al. |
| 2007/0086590 A1 | 4/2007 | Blom |
| 2007/0101122 A1 | 5/2007 | Buo |
| 2007/0124587 A1 | 5/2007 | Krishnamurthi et al. |
| 2007/0143614 A1 | 6/2007 | Holtmanns et al. |
| 2007/0294752 A1* | 12/2007 | Kinser et al. ............ 726/8 |
| 2008/0064369 A1* | 3/2008 | Xie et al. ............ 455/411 |
| 2008/0171534 A1* | 7/2008 | Holtmanns et al. ......... 455/411 |

FOREIGN PATENT DOCUMENTS

| | | |
|---|---|---|
| WO | 2007022800 A1 | 3/2007 |
| WO | 2007062672 A1 | 6/2007 |
| WO | 2007062689 A1 | 6/2007 |
| WO | 2007062882 A2 | 6/2007 |
| WO | 2007072237 A1 | 6/2007 |
| WO | 2007131548 A1 | 11/2007 |
| WO | 2007142566 A1 | 12/2007 |
| WO | 2008061570 A1 | 5/2008 |
| WO | 2009145443 A2 | 12/2009 |

OTHER PUBLICATIONS

ETSI Standards, "TISPAN Non Security; Security Architecture—NGN Release 1"; Draft ETSI TS 187 003 v0.0.3, Jan. 1, 2005; Section A.3 Huawei Technologies, Co., Ltd; "Key Management", pp. 66-79 of 92 pages.

Huawei, "A Proposal for IMS AKA and GBA Combination in IMDS Network (007 TD 171)" ETSI TISPAN#7. Jul. 11-15, 2005, 4 pages.

3GPP TS 24.109 V8.0.0 (Dec. 2008) Technical Specification Group Core Network and Terminals; Bootstrapping interface (Ub) and network application function interface (Ua); Ptorocol details (Release 8).

3GPP TS 33.220 V8.5.0 (Dec. 2008) Technical Specification Group Services and System Aspects; Generic Authentication Architecture (GAA); Generic bootstrapping architecture (Release 8).

3GPP TS 33.221 V8.0.0 (Dec. 2008) Technical Specification Group Services and System Aspects; Generic Authentication Architecture (GAA); Support for subscriber certificates (Release 8).

3GPP TS 33.222 V8.0.0 (Jun. 2008) Technical Specification Group Services and System Aspects; Generic Authentication Architecture (GAA); Access to network application functions using Hypertext, Transfer Protocol over Transport Layer Security (HTTPS) (Release 8).

3GPP TR 33.919 V8.0.0 (Dec. 2008) Technical Specification Group and System Aspects; 3G Security; Generic Authentication Architecture (GAA) System description (Release 8).

* cited by examiner

DEVICE AND METHOD FOR PROVIDING BOOTSTRAPPED APPLICATION AUTHENTICATION

FIELD OF THE INVENTION

The present invention relates generally to authenticating a user within a communication network, and more particularly, to jointly authenticating a user for more than one types of communication as part of a single request.

BACKGROUND OF THE INVENTION

Existing Internet protocol Multimedia Subsystems (IMS) registration procedures provide a single registration using the Session Initiation Protocol (SIP), which is generally effective for enabling a user to access most IMS-based services. Completion of the registration procedure generally results in the receipt of a security context in the form of a set of keys from an execution of an authentication and key agreement, which enables the user to access the IMS-based services. For example after IMS registration, the user can use multimedia telephony, instant messaging, presence, conferencing, as well as other IMS-based services generally without the need for further authentication.

Nevertheless, even after the user has executed an IMS registration, there are still instances in which the user needs to execute a further authentication as a result of contacting an IMS application server. At least a couple of examples of corresponding instances resulting in a further authentication includes instances in which a user wishes to access supplementary services including accessing or changing operating parameters or options that can be set in the network. At least a couple of examples include altering settings for multimedia telephone or settings for call forwarding, changing one's presence preferences, pulling policies from a server (i.e. Voice Call Continuity (VCC) policies), requesting a certificate from the server, and/or creating or editing a resource list (i.e. Push-To-Talk (PTT) contact list). In such instances, an additional security context involving a further authentication separate from the IMS security context is typically necessary between the user device and the application server. Such a supplemental authorization associated with the exemplary group of actions noted above is commonly referred to as a generic bootstrapping authentication.

Such an authentication differs from the IMS registration in that it commonly involves a HyperText Transfer Protocol (HTTP) digest Authentication and Key Agreement (AKA) authentication, in order to generate bootstrapping key material for use in accessing the application server(s). As a result, in addition to supporting AKA authentication as part of a SIP communication, the bootstrapping authentication involves AKA authentication support as part of an HTTP communication. Still further the additional authentication as presently provided in addition to being separately requested, also generally results in the authentications being separately refreshed including a second separate set of communications that are used to maintain the separate authentication and the corresponding key material and/or security context.

The present inventors have recognized that it would be beneficial to develop an apparatus and/or approach, which would enable multiple authentications to be managed as part of a single joint request.

SUMMARY OF THE INVENTION

The present invention provides a method in a device for authenticating the device for use in a network. The method includes requesting a first security context for use in securing a first type of communication, where as part of requesting the first security context, a second security context is jointly requested for use in securing a second type of communication. The first security context is then received and used to provide secure access and communication via the first type of communication. The second security context is then received and used to provide secure access and communication via the second type of communication.

In at least one embodiment, the entity which provides the authentication for the first security context includes a proxy, which acts on behalf of the device for requesting authentication for the second security context.

The present invention further provides a wireless communication device. The wireless communication device includes a user input adapted for receiving a request to initiate a network service, and a transceiver adapted for communicating with a network. The wireless communication device further includes a processor coupled to the user input and the transceiver. The processor includes an authentication module adapted for requesting a first security context for use in securing a first type of communication, where as part of requesting the first security context jointly requesting a second security context for use is securing a second type of communication, receiving the first security context, and receiving the second security context. The processor further includes a communication module adapted for using the first security context to provide secure access and communication via the first type of communication, and using the second security context to provide secure access and communication via the second type of communication.

The present invention still further provides for a system for authenticating a device in a network. The system includes one or more devices, and a first authentication entity adapted for establishing a first security context for at least one of the one or more devices, in response to a request from the device, for use in communicating within the network via a first type of communication. The first authentication entity is further adapted for acting on behalf of the at least one of the one or more devices in establishing a second security context with a second authentication entity for use by the one of the one or more devices in communicating within the network via a second type of communication, as part of establishing the first security context.

These and other objects, features, and advantages of this invention are evident from the following description of one or more preferred embodiments of this invention, with reference to the accompanying drawings.

DETAILED DESCRIPTION OF THE PREFERRED EMBODIMENT(S)

Figure 1:
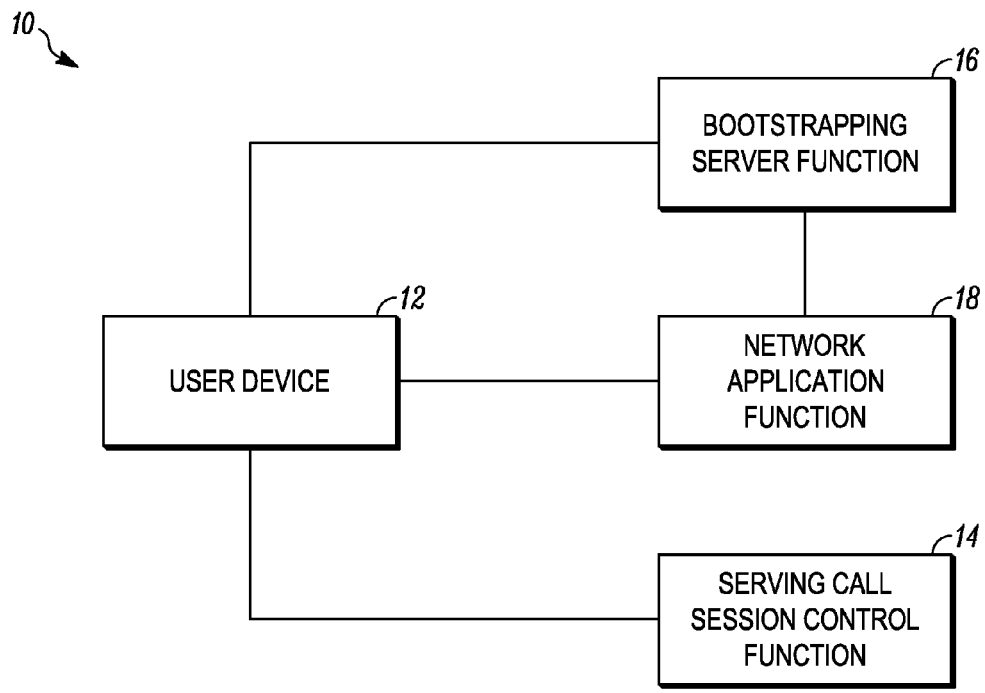
FIG. 1 is a block diagram of system for requesting each of a first security context and a second security context, as part of authenticating the device for use in a network, in accordance with at least some prior systems.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates a block diagram of system 10 for requesting each of a first security context and a second security context, as part of authenticating the device for use in a network, in accordance with at least some prior systems, which might support Session Initiation Protocol (SIP), HyperText Transfer Protocol (HTTP), and Internet protocol Multimedia Subsystem (IMS) protocols within a communication system supporting a 3GPP standard. While SIP, HTTP, IMS and 3GPP represent examples of communication protocols and/or standards with which the present invention is intended to operate, one skilled in the art will readily appreciate that the teachings of the present application are not limited for use with systems that support these protocols and/or standards, but similarly could be applied in instances where the joint authentication of a device for supporting secure access and communication via multiple types of communication with a single request might be deemed beneficial. Consequently, despite the present application being largely described in a context consistent with a SIP, HTTP, IMS and 3GPP supported environment, the benefits associated with the present invention may likely extend to still other communication environments.

In the illustrated embodiment, the illustrated prior system includes a user device 12, and a Serving Call Session Control Function (S-CSCF) 14 with which the user device 12 is authenticated as part of an IMS registration. However, as noted above in some circumstances, interaction with some IMS application will require a further registration, in some instances identified as bootstrapping authentication. The further authentication includes the user device communicating with the Bootstrapping Server Function (BSF) 16 in order to create a security context including bootstrapped keys (i.e. temporary username/password), which can then be used as part of a second authentication with the appropriate Network Application Function (NAF) 18, which is often managed as part of an application server. As part of being authenticated with the NAF 18, the NAF communicates with the BSF 16 in order to receive bootstrapping key material, which can be used as part of the authentication of the user device 12.

Such an arrangement involves AKA authentication as part of the IMS registration using SIP, and as part of the bootstrap authentication using HTTP, which substantially involves a largely duplicative challenge and response process, as part of the authentication.

Figure 2:
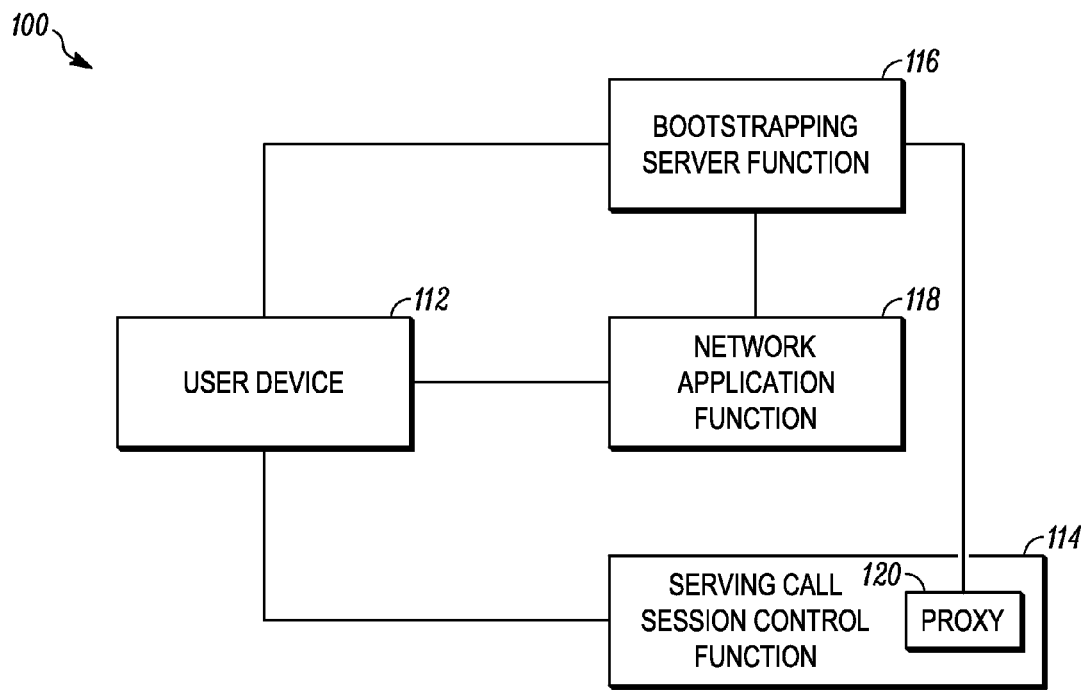
FIG. 2 is a block diagram of a system for requesting jointly a first security context and a second security context, as part of authenticating the device for use in a network, in accordance with at least one embodiment of the present invention.

Alternatively, FIG. 2 illustrates a block diagram of a system 100 for requesting jointly a first security context and a second security context, as part of authenticating the device for use in a network, in accordance with at least one embodiment of the present invention.

Similar to the system 10 illustrated in FIG. 1, the system in FIG. 2 similarly provides for a user device 112 which as part of the IMS registration using SIP provides for an AKA authentication. However the system illustrated in FIG. 2 and described as exemplary of present invention differs from prior systems, in that it allows additional parameters to be provided to the S-CSCF 114, which initiates a proxy 120 on behalf of the user device 112. In parallel, the proxy performs a bootstrapping authentication directly with the bootstrapping server function 116. Upon completion of the registration process, the user device 112 receives a security context for use in interacting with the S-CSCF 114 in support of secure communications of a first type, and receives a security context for use in interacting with an application server or network application function 118 in support of secure communications of a second type. In turn, this allows the user device to skip the direct separate registration and request for a security context with the bootstrapping server function that was included in prior systems independent of the IMS registration.

Figure 3:
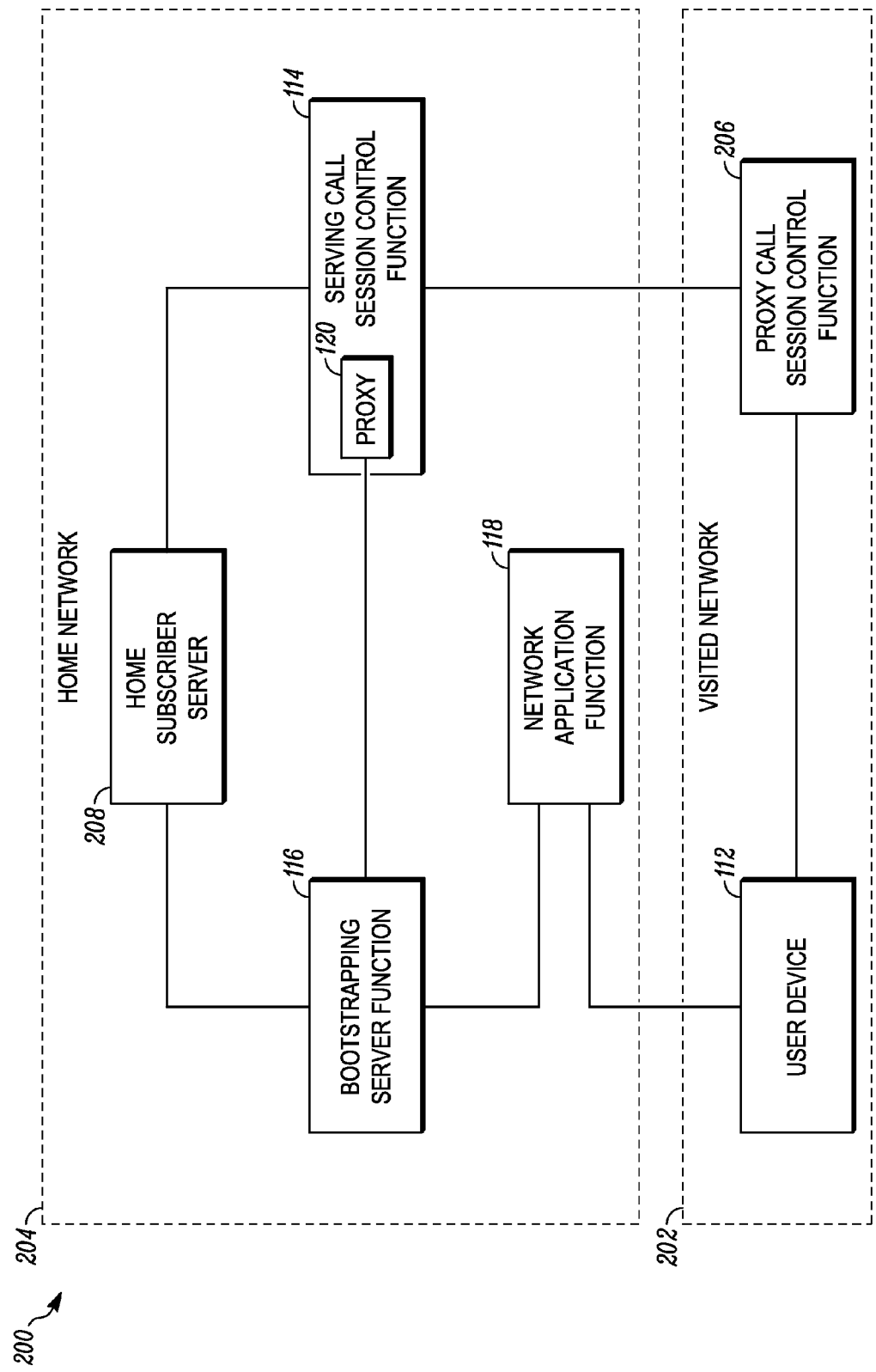
FIG. 3 is a more detailed block diagram of a system for requesting jointly a first security context and a second security context, as part of authenticating the device for use in a network, in accordance with at least one embodiment of the present invention.

FIG. 3 illustrates a more detailed block diagram of a system for requesting jointly a first security context and a second security context, as part of authenticating the device for use in a network, in accordance with at least one embodiment of the present invention. In the illustrated embodiment, the more detailed block diagram 200 separates the elements into elements associated with a home network 204 and elements associated with a visited network 202. However in reality, when the user device is communicating with the serving call session control function, it does so via a proxy call session control function (P-CSCF) 206 regardless as to whether the user device 112 is roaming in a visited network 202 or is present in the home network 204.

In connection with performing an authentication as part of the IMS registration, or as part of obtaining a security context in connection with creating the bootstrap keys, both of the serving call session control function 114 and the bootstrapping server function 116 communicate with the home subscriber server 208 in order to retrieve identification information needed to confirm the identity of the user device 112 including retrieving one or more AKA vectors containing both key material and information used to challenge the user device 112, as part of the issuance of the respective security context.

Figure 4:
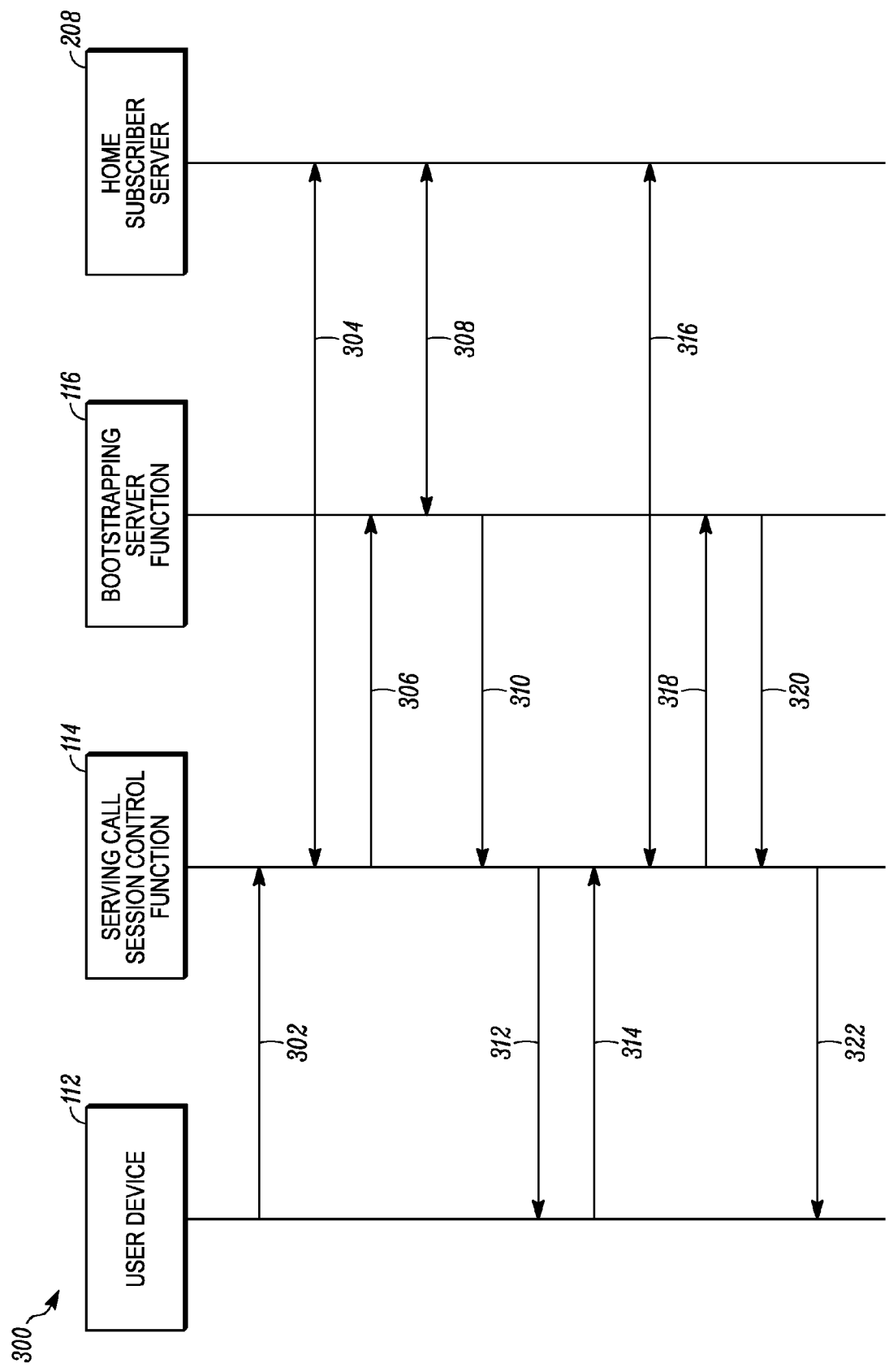
FIG. 4 is a message sequence diagram for establishing multiple security contexts, as part of a joint request while authenticating the device for use in a network, in accordance with at least one embodiment of the present invention.

FIG. 4 illustrates a message sequence diagram 300 for establishing multiple security contexts, as part of a joint request while authenticating the device for use in a network, in accordance with at least one embodiment of the present invention. The registration is initiated with a SIP register message 302 from the user device 112 to the serving call session control function 114, the message indicating a desire of the user device 112 to register for IMS functions. As part of the request the command indicates that the joint retrieval of both a first and second security context is similarly desired, and provides for the inclusion of a couple of additional parameters in support of the joint retrieval of the second security context. The additional parameters include information identifying that the user device 112 is requesting authentication for a second security context and information used to execute the authentication protocol in support of requesting the second security context. In at least one or more embodiments of the present invention, information identifying that the user device 112 is requesting authentication for a second security context includes a SIP header identifying the user device 112 as a Bootstrapping Client Agent and information used to execute the authentication protocol in support of requesting the second security context includes specific SIP Authorization headers used to execute an HTTP Digest AKA protocol for the bootstrapping procedure.

The serving call session control function 114 then communicates with the home subscriber server 208 to get authorization vectors 304 for the first security context, which might include an authorization request and an authorization response. In parallel, the proxy 120 existing in the serving call session control function 114 and operating on behalf of the user device 112 initiates an HTTP Get 306 with the bootstrapping server function 116. The bootstrapping server function 116 then communicates with the home subscriber server 208 to get authorization vectors 308 for the second security context.

The bootstrapping server function 116 then returns a challenge to the proxy 120 in the serving call session control function 114, which challenges the identity of the user device 112. The serving call session control function 114 then forwards the two challenges 312 to the user device 112 in support of both the IMS registration and the request for the bootstrapped security context. The user device 112 then responds with suitable responses 314 to both challenges 312, which confirms the user device's identity to the serving call session control function 114 and the bootstrapping server function 116. The serving call session control function 114 verifies the response for the first security context and then registers the user device for IMS services and downloads 316 the user's profile.

The proxy in the serving call session control function 114 then executes a further HTTP get 318, which includes an appropriate response for the second security context to the previous challenge from the bootstrapping server function 116, and receives 320 the requested security context from the bootstrapping server function 116. The security context from the bootstrapping server function 116, as well as a security context from the serving call session control function 114 is then returned 322 to the user device in support of future communications between the user device 112 and the serving call session control function 114 via the proxy call session control function 206, and in support of future communications between the user device 112 and an application server or network application function 118 without needing to first perform a separate request.

One of the advantages in merging the two requests, is the elimination of the need to separately support AKA as part of an HTTP client, which would otherwise be necessary to support the direct request between the user device 112 and the bootstrapping server function 116. A further benefit is the ability of the user device 112 to jointly maintain both security contexts through an interaction with the serving call session control function 114, which in turn communicates with the bootstrapping server function 116 via the proxy 120.

The message sequence 300, illustrated in FIG. 4, is intended to represent one example of a potential message sequence in accordance with the present invention. One skilled in the art could readily envision still further messages and/or a subset of the illustrated messages, which might be accommodated by the established proxy, and still provide a useful benefit, in accordance with the present invention.

Figure 5:
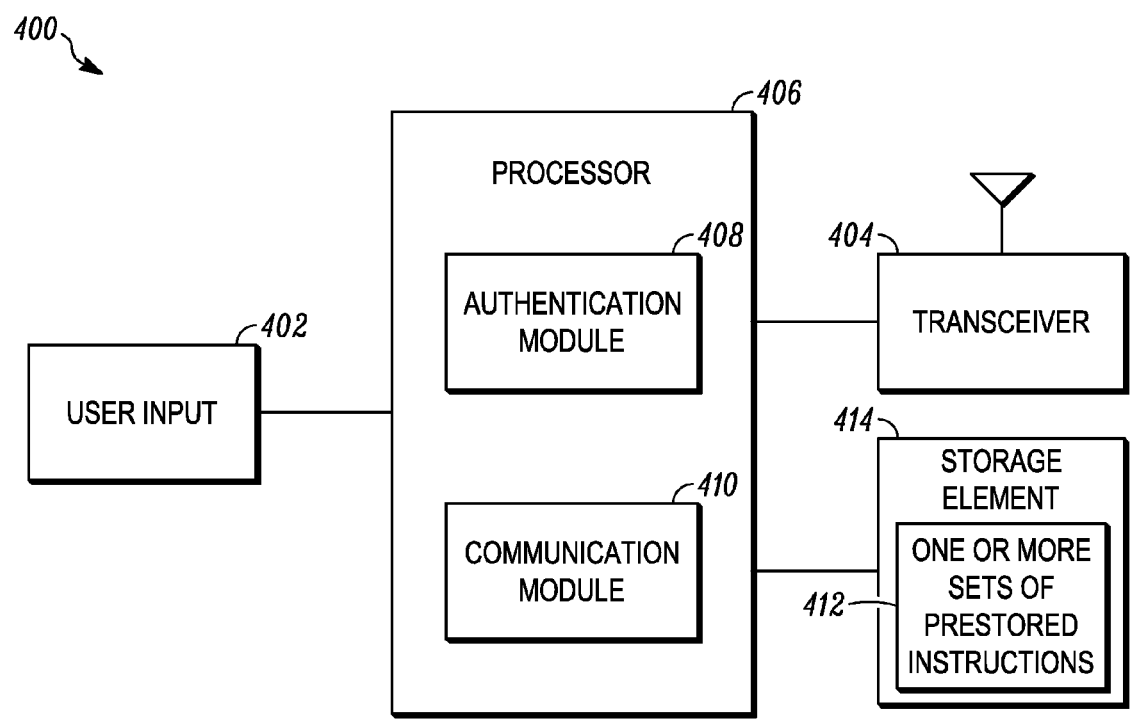
FIG. 5 is a block diagram of a wireless communication device, in accordance with at least one embodiment of the present invention.

FIG. 5 illustrates a block diagram of a wireless communication device 400, in accordance with at least one embodiment of the present invention. The wireless communication device 400 includes a user input 402 adapted for receiving a request to initiate a network service, and a transceiver 404 adapted for communicating with a network. The wireless communication device 400 further includes a processor 406 coupled to the user input 402 and the transceiver 404. The processor 406 includes an authentication module 408 adapted for requesting a first security context for use in securing a first type of communication, where as part of requesting the first security context a second security context is jointly requested for use is securing a second type of communication. The authentication module is further adapted to receive the first security context, and receive the second security context. The processor 406 further includes a communication module 410 adapted for using the first security context to provide secure access and communication via the first type of communication, and using the second security context to provide secure access and communication via the second type of communication.

In some embodiments, the processor 406 could be implemented in the form of a microprocessor, which is adapted to execute one or more sets of prestored instructions 412, which may be used to form at least part of one or more processor modules 408 and 410. The one or more sets of prestored instructions 412 may be stored in a storage element 414, which is either integrated as part of the processor or is coupled to the processor 406. The storage element 414 can include one or more forms of volatile and/or non-volatile memory, including conventional ROM, EPROM, RAM, or EEPROM. The storage element 414 may still further incorporate one or more forms of auxiliary storage, which is either fixed or removable, such as a harddrive or a floppydrive. One skilled in the art will still further appreciate, that still other further forms of memory could be used without departing from the teachings of the present invention. In the same or other instances, the processor 406 may incorporate state machines and/or logic circuitry, which can be used to implement at least partially, some of modules and their corresponding functionality.

Figure 6:
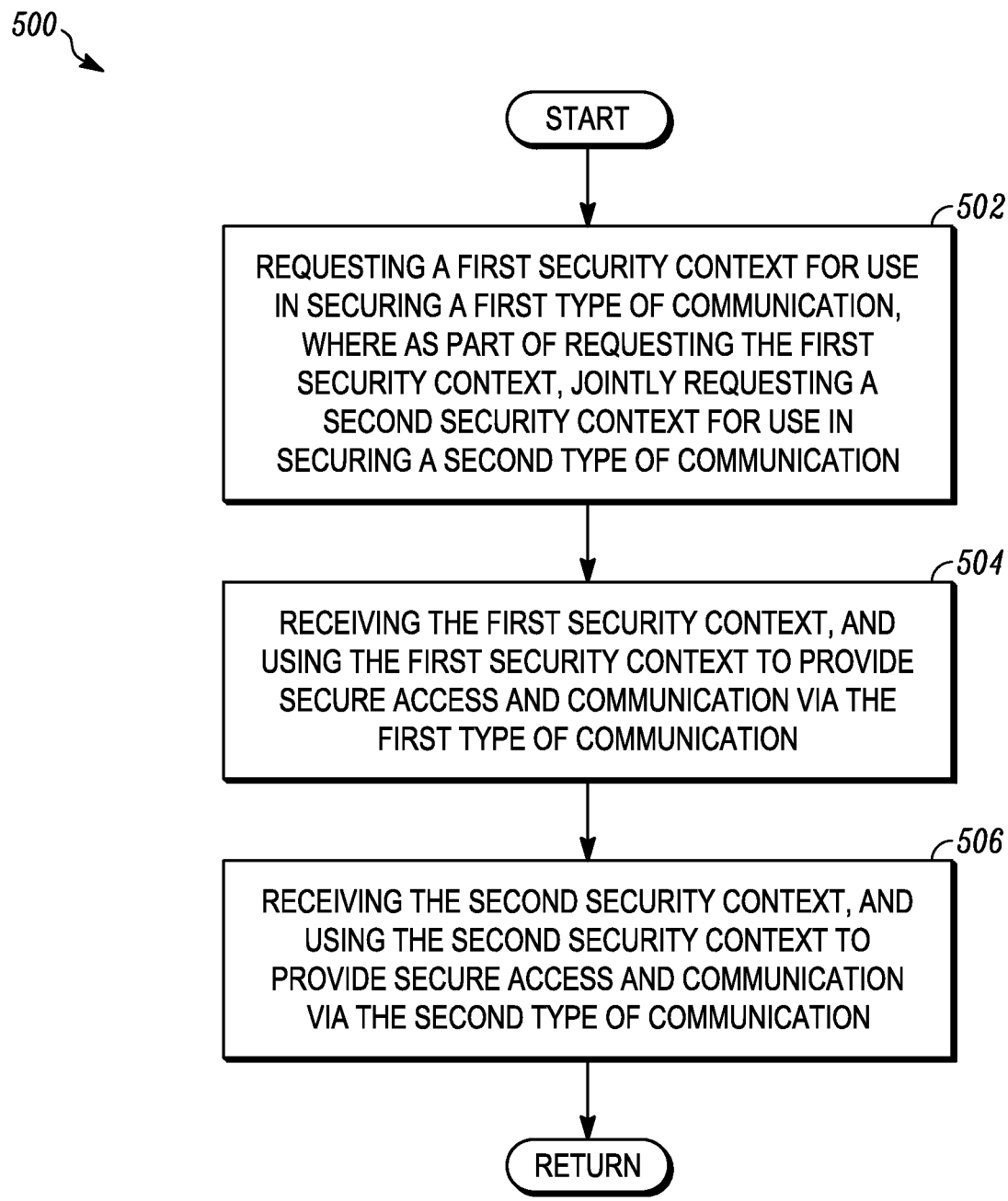
FIG. 6 is a flow diagram of a method for authenticating a device for use in a network, in accordance with at least one embodiment of the present invention.

FIG. 6 illustrates a flow diagram 500 of a method includes requesting 502 a first security context for use in securing a first type of communication, where as part of requesting the first security context, a second security context is jointly requested for use in securing a second type of communication. The first security context is then received 504 and used to provide secure access and communication via the first type of communication. The second security context is then received 506 and used to provide secure access and communication via the second type of communication.

In at least one embodiment, the entity which provides the authentication for the first security context includes a proxy, which acts on behalf of the device for requesting authentication for the second security context.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method in a device for authenticating the device for use in a network comprising:
    transmitting a first request to a serving call session control function, the first request jointly requesting a first security context for use in securing a first type of communication and a second security context for use in securing a second type of communication, the first request initiating a proxy on behalf of the device to obtain authorization for the first security context and in parallel to obtain authorization from a bootstrapping server function for the second security context;

receiving the first security context in response to the first request, and using the first security context to provide secure access and communication via the first type of communication; and receiving the second security context in response to the first request, and using the second security context to provide secure access and communication via the second type of communication.

2. A method in accordance with claim 1 wherein the request for the second security context is encoded as one or more parameters associated with the request for the first security context.

3. A method in accordance with claim 2 wherein the one or more parameters include information identifying that the user device is requesting authentication for a second security context and information used to execute the authentication protocol in support of requesting the second security context.

4. A method in accordance with claim 1 wherein the request for the first security context is part of a request to establish a session initiation protocol (SIP) type communication connection.

5. A method in accordance with claim 1 wherein the first security context is an Internet protocol multimedia subsystem (IMS) security context.

6. A method in accordance with claim 1 wherein the request for the first security context includes an authentication and a key agreement in support of communications of a first type.

7. A method in accordance with claim 1 wherein the request for the second security context is part of a request to establish a communication connection with a network application function.

8. A method in accordance with claim 7 wherein the network application function includes one or more of accessing a server to modify multimedia telephony settings.

9. A method in accordance with claim 7 wherein the network application function includes one or more of accessing a server to change presence preferences.

10. A method in accordance with claim 7 wherein the network application function includes one or more of accessing a server to pull policies from a server.

11. A method in accordance with claim 7 wherein the network application function includes one or more of accessing a server to request a certificate from a server.

12. A method in accordance with claim 7 wherein the network application function includes one or more of accessing a server to create or edit a resource list on a server.

13. A method in accordance with claim 1 wherein the second security context is a bootstrapped security context.

14. A method in accordance with claim 1 wherein the request for the second security context includes an authentication and a key agreement in support of communications of a second type.

15. A method in accordance with claim 1 wherein the entity which provides the authentication for the first security context includes a proxy, which acts on behalf of the device for requesting authentication for the second security context.

16. A wireless communication device comprising:
   a user input adapted for receiving a request to initiate a network service;
   a transceiver adapted for communicating with a network; and
   a processor coupled to the user input and the transceiver, the processor for generating a first request to a serving call session control function jointly seeking a first security context for use in securing a first type of communication and a second security context for use in securing a second type of communication, the first request initiating a proxy on behalf of the device to obtain authorization for the first security context and in parallel to obtain authorization from a bootstrapping server function for the second security context;
   wherein the first request is transmitted by the transceiver; and
   wherein the transceiver receives the first security context in response to the first request and receiving the second security context in response to the first request; and the processor adapted for using the first security context to provide secure access and communication via the first type of communication; and using the second security context to provide secure access and communication via the second type of communication.

17. A wireless communication device in accordance with claim 16 wherein the wireless communication device is a radio frequency telephone.

18. A wireless communication device in accordance with claim 17 wherein the radio frequency telephone is a cellular telephone.

* * * * *